(12) United States Patent
Abekawa

(10) Patent No.: US 11,315,351 B2
(45) Date of Patent: Apr. 26, 2022

(54) INFORMATION PROCESSING DEVICE, INFORMATION PROCESSING METHOD, AND INFORMATION PROCESSING PROGRAM

(71) Applicant: Kabushiki Kaisha Genial Technology, Kanagawa (JP)

(72) Inventor: Akimasa Abekawa, San Jose, CA (US)

(73) Assignee: Kabushiki Kaisha Genial Technology, Kanagawa (JP)

( * ) Notice: Subject to any disclaimer, the term of this patent is extended or adjusted under 35 U.S.C. 154(b) by 256 days.

(21) Appl. No.: 16/737,212

(22) Filed: Jan. 8, 2020

(65) Prior Publication Data

US 2021/0209354 A1    Jul. 8, 2021

(51) Int. Cl.
*G06V 30/413*    (2022.01)
*G06V 30/412*    (2022.01)
*G06V 30/416*    (2022.01)
*G06V 30/10*     (2022.01)

(52) U.S. Cl.
CPC .......... *G06V 30/413* (2022.01); *G06V 30/412* (2022.01); *G06V 30/416* (2022.01); *G06V 30/10* (2022.01)

(58) Field of Classification Search
CPC .......... G06K 9/00449; G06K 9/00456; G06K 9/00469; G06K 9/18; G06K 2209/01; G06V 30/10; G06V 30/224; G06V 30/412; G06V 30/413; G06V 30/416
USPC ........................................................ 382/224
See application file for complete search history.

(56) References Cited

U.S. PATENT DOCUMENTS

| 10,210,579 | B1 * | 2/2019 | Neveu | G06Q 10/1093 |
| 10,764,448 | B1 * | 9/2020 | Nakamura | G06K 9/344 |
| 2021/0272084 | A1 * | 9/2021 | Chan | G06Q 20/4016 |

FOREIGN PATENT DOCUMENTS

| JP | 2001-061061 | 3/2001 |
| JP | 2009-031937 | 2/2009 |
| JP | 2018-194971 | 12/2018 |
| JP | 2019-079147 | 5/2019 |
| WO | WO 2019/012570 | 1/2019 |

* cited by examiner

*Primary Examiner* — Daniel G Mariam
(74) *Attorney, Agent, or Firm* — Levine Bagade Han LLP

(57) ABSTRACT

The information processing device includes: a reception unit configured to receive image data regarding an accounting supporting document; a first acquisition unit configured to recognize characters in the image data and acquire the recognized characters as character data; a first identification unit configured to identify a purpose classification on the basis of the character data acquired by the first acquisition unit and the image data; an allocation unit configured to identify a standard item regarding the accounting supporting document on the basis of the character data and allocate characters to the standard item; an association unit configured to associate the characters with other characters adjacent to the characters; and an output unit configured to output the purpose classification identified by the first identification unit and the standard item and the other characters in a format in which the standard item and the other characters are associated by the association unit.

5 Claims, 6 Drawing Sheets

FIG. 2

| INVOICE | | |
|---|---|---|
| A Co., Ltd. | | |
| | | B Co., Ltd. |
| ITEM | VOLUME | PRICE (YEN) |
| ○○○ | 1 | 5,000 |
| □□□ | 3 | 9,000 |
| △△△ | 2 | 10,000 |
| TOTAL | | 24,000 |

FIG. 3

| ITEM | VOLUME | | PRICE (YEN) | |
|---|---|---|---|---|
| ○○○ | 1 | ✓ | 5,000 | ✓ |
| □□□ | 3 | ✓ | 9,000 | ✓ |
| △△△ | 2 | ✓ | 10,000 | ✓ |
| TOTAL | | | 24,000 | ✓ |

INVOICE

A Co., Ltd.

B Co., Ltd.

FIG. 4

| | D | C | C |
|---|---|---|---|
| | INVOICE DATE | NOVEMBER 1, 2019 | |
| | INVOICE NUMBER | A1234567 | D |
| | C | C | |

| ITEM | VOLUME | PRICE (YEN) |
|---|---|---|
| ○○○ | 1 | 5,000 |
| □□□ | 3 | 9,000 |
| △△△ | 2 | 10,000 |
| TOTAL | | 24,000 |

FIG. 5

| INVOICE | | |
|---|---|---|
| A Co., Ltd. | | |
| | | B Co., Ltd. |

| ITEM | VOLUME | PRICE (YEN) |
|---|---|---|
| ○○○ | 1 | 5,000 |
| □□□ | 3 | 9,000 |
| △△△ | 2 | 10,000 |
| TOTAL | | 24,000 |

| OCR ITEM | COORDINATES | TABLE | HEADER NAME | CHARACTER TYPE | REGULAR EXPRESSION |
|---|---|---|---|---|---|
| TITLE | ☑ | ☐ | | JAPANESE | |
| DESTINATION | ☑ | ☐ | | JAPANESE | |
| SOURCE | ☑ | ☐ | | JAPANESE | |
| ITEM | ☐ | ☑ | ITEM | ALPHANUMERIC | |
| VOLUME | ☐ | ☑ | VOLUME | NUMBER | |
| PRICE | ☐ | ☑ | PRICE | NUMBER | ¥\d{1,3}(,\d{3})* |
| TOTAL PRICE | ☑ | ☐ | | NUMBER | ¥\d{1,3}(,\d{3})* |

INFORMATION PROCESSING DEVICE, INFORMATION PROCESSING METHOD, AND INFORMATION PROCESSING PROGRAM

BACKGROUND OF THE INVENTION

Field of the Invention

The invention relates to an information processing device, an information processing method, and an information processing program.

Description of Related Art

In the related art, digitalization of a supporting document that is prepared using a sheet of paper has been performed to handle the supporting document with a computer or the like. In a technique described in Patent Document 1, optical character recognition (OCR) is performed on image data that is generated on the basis of a paper supporting document and input data (first input data) that is required for preparing a journal entry is generated on the basis of character data acquired by OCR. In the technique described in Patent Document 1, a user manually inputs details of the paper supporting document to a computer and generates input data (second input data) based on the manual input. In the technique described in Patent Document 1, a warning is issued when there is a mismatch between details based on the first input data and details based on the second input data.

PATENT DOCUMENTS

[Patent Document 1] Japanese Unexamined Patent Application Publication No. 2018-194971

SUMMARY OF THE INVENTION

Patent Document 1 discloses a technique of outputting journal data from a structured supporting document such as a receipt and a bankbook. Accordingly, in the technique described in Patent Document 1, there is a possibility that an OCR template setting operation, which is performed in advance by a user or the like, will cause an increase in costs.

However, there are various types of accounting supporting documents, and templates, which are used for character recognition, cannot support various types of accounting supporting documents in the related art.

An objective of the invention is to provide an information processing device, an information processing method, and an information processing program that can recognize characters and digitize an accounting supporting document.

An information processing device according to an aspect includes: a reception unit configured to receive image data regarding an accounting supporting document; a first acquisition unit configured to recognize characters in the image data and to acquire the recognized characters as character data; a first identification unit configured to identify a purpose classification, which is a purpose of the accounting supporting document, on the basis of the character data acquired by the first acquisition unit and the image data received by the reception unit; an allocation unit configured to identify a standard item regarding the accounting supporting document on the basis of the character data and to allocate characters corresponding to the identified standard item to the standard item; an association unit configured to associate the characters corresponding to the standard item identified by the allocation unit with other characters adjacent to the characters; and an output unit configured to output the purpose classification identified by the first identification unit and the standard item and the other characters in a format in which the standard item and the other characters are associated by the association unit.

In the information processing device according to an aspect, the first acquisition unit may include: a second identification unit configured to estimate a printed area in which characters are printed and a handwritten area in which characters are handwritten in the accounting supporting document corresponding to the image data received by the reception unit and to identify the handwritten area; and a replacement unit configured to replace characters described in the handwritten area identified by the second identification unit with a color of a background in which no character is described.

In the information processing device according to an aspect, the first identification unit may include: a second acquisition unit configured to acquire features of an image based on the image data; a preparation unit configured to prepare a shortlist of model images which are candidates for the purpose classification on the basis of the features acquired by the second acquisition unit; and a third identification unit configured to identify the purpose classification on the basis of the shortlist prepared by the preparation unit and the features of the image data.

An information processing method according to an aspect causes a computer to perform: a reception step that receives image data regarding an accounting supporting document; a first acquisition step that recognizes characters in the image data and acquires the recognized characters as character data; a first identification step that identifies a purpose classification, which is a purpose of the accounting supporting document, on the basis of the character data acquired in the first acquisition step and the image data received in the reception step; an allocation step that identifies a standard item regarding the accounting supporting document on the basis of the character data and allocates characters, corresponding to the identified standard item, to the standard item; an association step that associates the characters, corresponding to the standard item identified in the allocation step, with other characters adjacent to the characters; and an output step that outputs the purpose classification identified in the first identification step, the standard items, and the other characters in a format in which the standard items and the other characters are associated in the association step.

An information processing program according to an aspect causes a computer to perform: a reception function that receives image data regarding an accounting supporting document; a first acquisition function that recognizes characters in the image data and acquires the recognized characters as character data; a first identification function that identifies a purpose classification, which is a purpose of the accounting supporting document, on the basis of the character data acquired by the first acquisition function and the image data received by the reception function; an allocation function that identifies a standard item regarding the accounting supporting document on the basis of the character data and allocates characters, corresponding to the identified standard item, to the standard item; an association function that associates the characters, corresponding to the standard item identified by the allocation function, with other characters adjacent to the characters; and an output function that outputs the purpose classification identified by the first identification function, the standard items and the other characters in a format in which the standard items and the other characters are associated by the association function.

Since the information processing device according to the aspect identifies a purpose classification, which is a purpose of an accounting supporting document, from image data or character data based on the accounting supporting document, identifies standard items regarding the accounting supporting document from the character data, allocates characters corresponding to the identified standard items to the standard items, associates the characters corresponding to the standard items with other characters adjacent to the characters, and outputs the identified purpose classification and the standard items and the other characters in a format in which the standard items and the other characters are associated, it is possible to automatically prepare a character recognition template for each format of accounting supporting documents. By using this character recognition template, it is possible to recognize characters and digitize an accounting supporting document in a similar format.

An information processing method and an information processing program according to an aspect can achieve the same advantageous effects as in the information processing device.

BRIEF DESCRIPTION OF THE DRAWINGS

FIG. 2 is a diagram illustrating an example of an accounting supporting document;

FIG. 3 is a diagram illustrating an example of an accounting supporting document including handwritten details;

FIG. 4 is a diagram illustrating an association between a character and another character adjacent to the character;

FIG. 5 is a diagram illustrating an example of a template which is displayed on a display unit.

DETAILED DESCRIPTION OF THE INVENTION

Hereinafter, an embodiment of the invention will be described.

Figure 1:
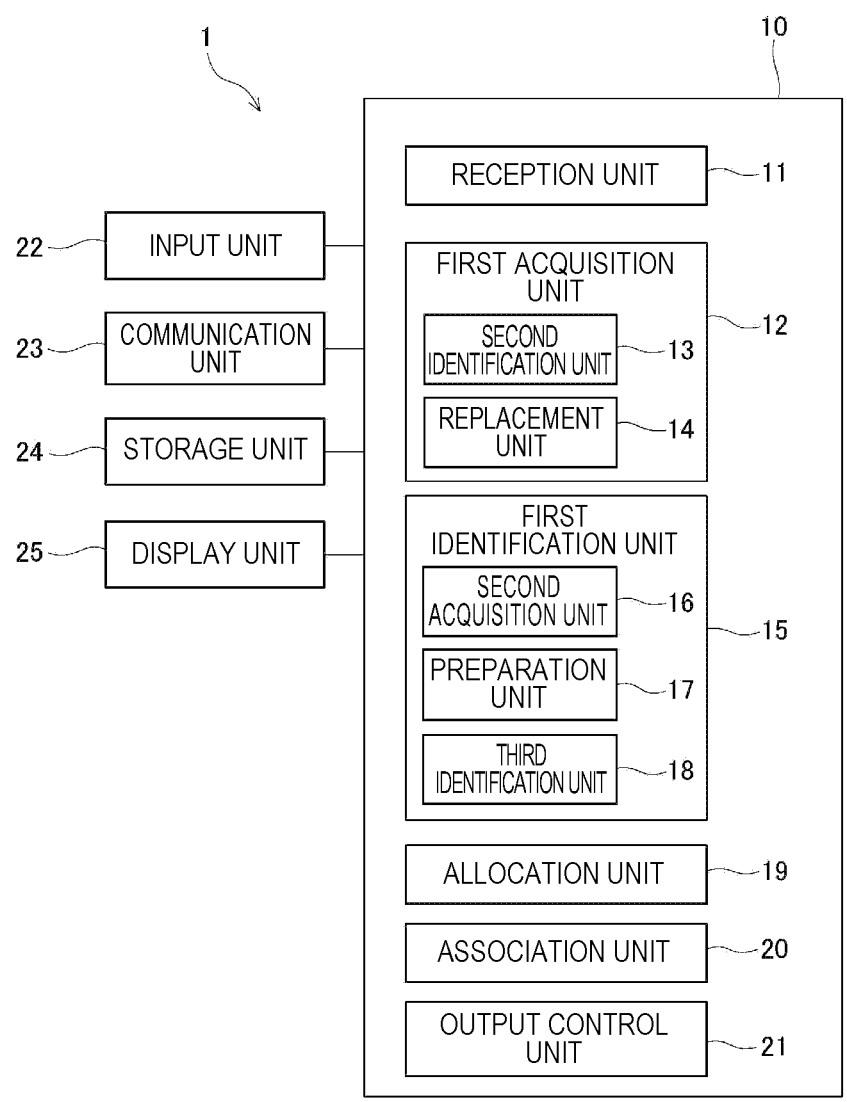
FIG. 1 is a block diagram illustrating an information processing device according to an embodiment.

FIG. 1 is a block diagram illustrating an information processing device 1 according to an embodiment.

FIG. 2 is a diagram illustrating an example of an accounting supporting document.

The information processing device 1 illustrated in FIG. 1 is a device that digitizes an accounting supporting document and outputs a template. For example, a template is setting data that is digitized depending on a description style of an accounting supporting document and is used to efficiently recognize characters on the same accounting supporting document. An example of the accounting supporting document is an invoice illustrated in FIG. 2. In an accounting supporting document (an invoice) illustrated in FIG. 2, "INVOICE" is described in the vicinity of the head and represents the purpose of the accounting supporting document. In the invoice, a table is described, and item names, volumes, prices, and the like are described in the table. Accounting supporting document data which is subjected to character recognition and structured by labels may be, for example, edited in character or the like by a user. The information processing device 1 is not limited to an accounting supporting document and may digitize various types of documents and make the digitized documents into templates.

The information processing device 1 performs character recognition on the basis of image data on an accounting supporting document. When a table is included in the accounting supporting document, the information processing device 1 performs character recognition in association with characters that are described in rows or columns in the table. An example of character recognition that is performed by the information processing device 1 is optical character recognition (OCR). Accordingly, the information processing device 1 can automatically set character recognition templates for non-structured accounting supporting documents in addition to structured accounting supporting documents.

The information processing device 1 will be described below in detail.

The information processing device 1 includes an input unit 22, a communication unit 23, a storage unit 24, an output unit (a display unit) 25, a reception unit 11, a first acquisition unit 12, a first identification unit 15, an allocation unit 19, an association unit 20, and an output control unit 21. The first acquisition unit 12 includes a second identification unit 13 and a replacement unit 14. The first identification unit 15 includes a second acquisition unit 16, a preparation unit 17, and a third identification unit 18. The reception unit 11, the first acquisition unit 12 (the second identification unit 13 and the replacement unit 14), the first identification unit 15 (the second acquisition unit 16, the preparation unit 17, and the third identification unit 18), the allocation unit 19, the association unit 20, and the output control unit 21 may be embodied as functions of a control unit 10 (an operation processing device) of the information processing device 1.

The input unit 22 may be, for example, an image reading device such as a scanner. The input unit 22 reads an accounting supporting document in a form of a sheet of paper and generates image data associated with the accounting supporting document.

The communication unit 23 is a device that can receive data, for example, from the outside of the information processing device 1. The communication unit 23 receives data, for example, from an external server and an external terminal (a personal computer and a tablet PC) outside the information processing device 1. For example, the data may be image data regarding an accounting supporting document.

The storage unit 24 is, for example, a device that can store various types of data and programs. When an accounting supporting document is read by the input unit 22 and image data regarding the accounting supporting document is generated, the storage unit 24 stores the generated image data. When image data regarding an accounting supporting document is received from the outside of the information processing device 1 by the communication unit 23, the storage unit 24 stores the received image data.

The reception unit 11 receives image data on an accounting supporting document (first image data). The reception unit 11 reads image data on an accounting supporting document stored in the storage unit 24 and receives an input thereof to the information processing device 1. When image data of an accounting supporting document is received by the communication unit 23, the reception unit 11 may receive the received image data.

The first acquisition unit 12 recognizes characters included in the image (the first image data) and acquires the recognized characters as character data. An example of character recognition is OCR.

First, when it is designated by a user, the first acquisition unit 12 deletes handwritten characters in the accounting supporting document when there are the handwritten characters before character recognition has been performed on the image data. That is, since an accounting supporting document is relatively often printed, the first acquisition unit 12 deletes other characters (handwritten characters) other than printed characters such that only the printed characters (including numerals and signs) can be recognized. Specifically, the first acquisition unit 12 performs the following process.

The second identification unit 13, which is one function of the first acquisition unit 12, estimates a printed area in which characters are printed and a handwritten area in which characters are handwritten in the accounting supporting document corresponding to the image data received by the reception unit 11, and identifies the handwritten area. The second identification unit 13 estimates the printed area and the handwritten area, for example, using a neural network. Specifically, the second identification unit 13 generates a machine learning model by learning handwritten characters in an accounting supporting document in advance and estimates the printed area and the handwritten area in the accounting supporting document on the basis of the machine learning model and the image data.

When the handwritten area is estimated, the second identification unit 13 calculates a feature of the handwritten area. For example, an AKAZE feature may be used as the feature. The second identification unit 13 can relatively increase a processing speed using a local binary feature such as the AKAZE feature. However, another feature (for example, a KAZE feature), instead of the AKAZE feature, may be used as long as a feature of handwritten characters can be extracted.

The second identification unit 13 calculates a degree of similarity between the calculated features and features (a model) of a handwritten image, which are calculated in advance. The features (a model), which are calculated in advance, serve as a reference for determining a handwritten image. The second identification unit 13 identifies (determines) that details described in the handwritten area are handwritten characters (not printed characters) when the degree of similarity is equal to or greater than a threshold value.

The second identification unit 13 may identify (determine) handwritten characters, for example, using machine learning (or deep learning) such as a neural network or a support vector machine instead of performing identification (determination) based on the degree of similarity. In this case, the second identification unit 13 can enhance the accuracy of identification (determination) of handwritten characters, for example, using an Exemplar-SVM.

Here, in order to perform the above-mentioned process, the second identification unit 13 needs to store features of handwritten images such as a check mark and memo writing, which are described in the accounting supporting document, as model data in advance. Accordingly, the second identification unit 13 can relatively increase accuracy for identifying a handwritten character and reproducibility thereof by cutting out more checkmark parts using image editing software and calculating and storing more features. When there are sufficient sets of feature data, the second identification unit 13 can set a threshold value of a degree of similarity, which is used for identifying a handwritten character, to be relatively high and hereby curb falsely positive determination and falsely negative determination The replacement unit 14, which is one function of the first acquisition unit 12, replaces a character that is described in the handwritten area identified by the second identification unit 13 with a color of the background (a background color), in which no character is described. That is, the replacement unit 14 replaces pixels that are identified to be handwritten (as a handwritten area) with the background color. The replacement unit 14 may consider a mode of another area that is not estimated to be the printed area and the handwritten area to be the background color.

Figure 3:
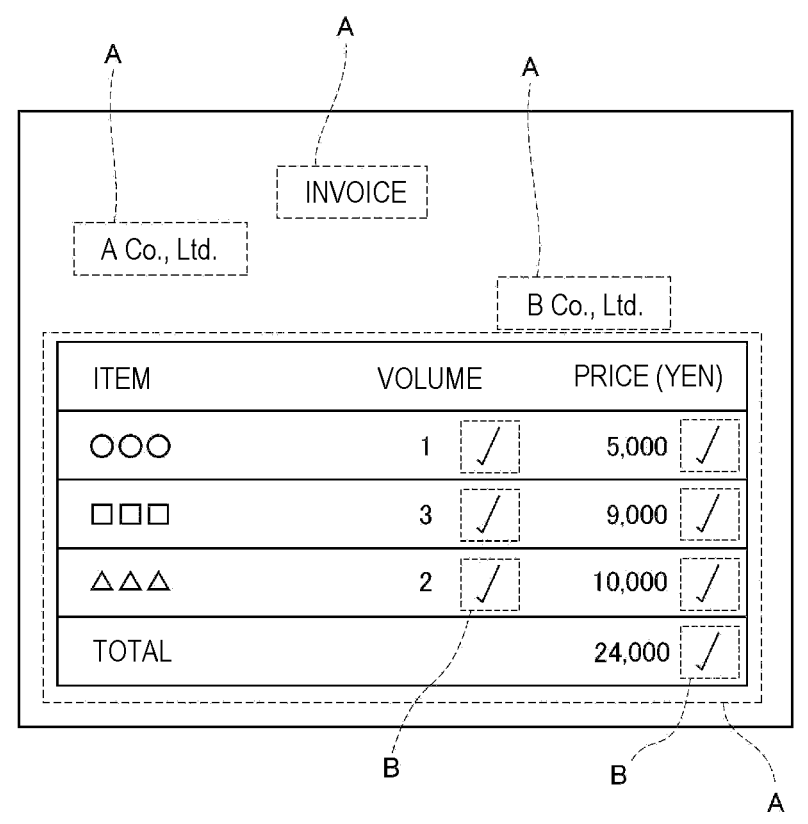

FIG. 3 is a diagram illustrating an example of an accounting supporting document, including handwritten details.

In the example illustrated in FIG. 3, it is assumed that check marks are handwritten.

The second identification unit 13 estimates "INVOICE," "A Co., Ltd.," "B Co., Ltd.," and a table to be a printed area A and estimates the check marks to be a handwritten area B. The replacement unit 14 replaces characters (check marks) in the handwritten area B with the background color.

Then, the first acquisition unit 12 recognizes an image based on image data in which handwritten characters have been deleted (second image data). In this case, the first acquisition unit 12 recognizes characters and tables by image recognition.

For example, first, the first acquisition unit 12 recognizes characters with the whole image data (the second image data) set as a recognition target and acquires coordinate information identifying areas of recognized characters. The coordinate information may be the information of coordinates indicating a position in the accounting supporting document. Then, when a plurality of pixels with low brightness are continuously arranged in the image data (the second image data), the first acquisition unit 12 detects a straight line including the pixels as a ruled line and clusters the plurality of pixels. Then, the first acquisition unit 12 classifies the plurality of pixels that have been clustered into rows and columns of a table. For example, when the plurality of pixels which are clustered are arranged in the horizontal direction and the vertical direction, the first acquisition unit 12 classifies the plurality of pixels into rows and columns of a table. Then, the first acquisition unit 12 applies the coordinate information identifying the area of characters to data associated with the rows and the columns, more finely classifies the rows and the columns using the coordinate information, and recognizes a header name of the table. That is, the first acquisition unit 12 recognizes characters that are located in a first row (or several first rows) of rows or columns of the table as a header name.

The first identification unit 15 identifies a purpose classification on the basis of the characters outside the table and the header name inside the table, which are recognized as described above. That is, the first identification unit 15 identifies the purpose classification on the basis of the character data acquired by the first acquisition unit 12 and the image data received by the reception unit 11. The purpose classification is a noun that represents the purpose of the accounting supporting document. For example, when a specific keyword (for example, "Invoice" or "Purchase Order") is in the recognized characters and characters corresponding to the keyword (for example, "INVOICE") is located in the vicinity of the head of the accounting supporting document, the first identification unit 15 identifies a classification ("INVOICE") to which the characters belong as the purpose classification. The specific keyword is classified for each detail of the accounting supporting documents and is registered in the storage unit 24 in advance.

When a purpose classification cannot be identified as described above, the first identification unit 15 performs, for example, the following process.

The second acquisition unit 16, which is one function of the first identification unit 15, acquires a feature of an image based on the image data (the second image data). Specifically, the first identification unit 15 calculates, for example, the AKAZE features as the features of the image.

The preparation unit 17, which is one function of the first identification unit 15, prepares a shortlist of candidates for a purpose classification on the basis of the features acquired by the second acquisition unit 16. That is, the preparation unit 17 compares degrees of similarity between the features calculated from an image based on the second image data and the features of a plurality of model images, which are prepared in advance, and prepares a shortlist (a list of model images with a high degree of similarity) on the basis of the model images of which the degree of similarity is equal to or greater than a threshold value. More specifically, the preparation unit 17 may prepare the shortlist by quantizing the features calculated by the second acquisition unit 16 and searching a database of model images that are prepared in advance using queries based on the features of the second image data.

The third identification unit 18, which is one function of the first identification unit 15, identifies a purpose classification on the basis of the shortlist prepared by the preparation unit 17 and the features of the second image data.

That is, when there is only one type of purpose classifications of the model images included in the shortlist prepared by the preparation unit 17, the third identification unit 18 identifies it as a purpose classification. For example, when the purpose classifications of the images included in the shortlist are all "INVOICE," the third identification unit 18 classifies the images based on the second image data as an invoice.

On the other hand, when there are a plurality of model images included in the shortlist prepared by the preparation unit 17, the third identification unit 18 compares the degrees of similarity between all the model images in the shortlist and the queries (features of the second image data) and identifies the model image with the highest degree of similarity as a purpose classification. The third identification unit 18 can use methods to compare the degree of similarity that are relatively slow but strict, such as calculation of the number of key points with the same feature values and Euclidean distances between the features.

The third identification unit 18 identifies a purpose classification of the model image with the highest degree of similarity as a purpose classification of a query image. More specifically, the third identification unit 18 may calculate a degree of similarity from a distance of a quantization error from a query image for each model image included in the shortlist.

In this case, in the process of the third identification unit 18, a database needs to be constructed on the basis of a plurality of model images in advance before images are processed. It is necessary to calculate features of model images similarly to the process of the second acquisition unit 16, (1) to arrange codewords through product quantization, and (2) to construct a key-value database in which one arranged codeword corresponds to a plurality of values (such as an image ID, a code after product quantization corresponding to the image ID, and a purpose classification). The key-value database is a database in which data to be stored (value) and a sign (key) corresponding to the data are set and stored as a pair.

By identifying a purpose classification as described above, the information processing device 1 can acquire a set of standard items. That is, the information processing device 1 stores a set of standard items corresponding to each purpose classification in the storage unit 24 in advance. When the purpose classification is an "INVOICE," the information processing device 1 can acquire a title, an invoice number, an invoice date, a billing source, a billing destination, an item, a unit price, a volume, a tax-excluded price, a consumption tax, and a tax-included price as examples of the standard items.

The allocation unit 19 identifies a standard item of an accounting supporting document on the basis of the character data and allocates characters corresponding to the identified standard item to the standard item. That is, the allocation unit 19 allocates standard items that are predetermined for each purpose classification to the purpose classification identified by the first identification unit 15 on the basis of the characters and the header name of the table recognized by the first acquisition unit 12. The standard items become labels in a template, which will be described later.

For example, the allocation unit 19 determines whether the characters corresponding to the standard items or pre-registered words (alternative words) are included in the characters and the header name of the table recognized by the first acquisition unit 12. When the characters corresponding to the standard items are included, the allocation unit 19 sets the corresponding characters or the corresponding header name of the table as standard items. When an alternative word is included in the characters or the header name of the table, the allocation unit 19 replaces the alternative word with a standard item. When there is a standard item which is not included in the characters and the header name of the table recognized by the first acquisition unit 12, the allocation unit 19 calculates a semantic distance between the characters and the header name of the table and the standard item and allocates the characters or the header name of the table having the shortest distance to the standard item.

The association unit 20 associates characters described outside the table.

FIG. 4 is a diagram illustrating the association between characters and other characters adjacent to the characters.

The association unit 20 associates characters corresponding to the standard item identified by the allocation unit 19 with other characters adjacent to the characters. As illustrated in FIG. 4, the association unit 20 associates characters (see a dotted line C) and other characters (see a dotted line C) adjacent to the characters with a range surrounded by a dotted line D.

That is, first, the association unit 20 clusters the recognized characters on the basis of coordinate information identifying an area of the characters recognized by the first acquisition unit 12. Then, the association unit 20 associates coordinate information of a cluster, not including an item name to which a standard item is allocated out of clusters located on the right or lower side in the area of the characters corresponding to the standard item with the corresponding standard item. Then, the association unit 20 sets a recognition target area based on only the coordinate information of the cluster for the standard item, not requiring a character image serving as a label such as the title of an accounting supporting document.

More specifically, the association unit 20 allocates a recognition target area to each standard item. The recognition target area is expressed, for example, by a header name in the case of a table and by coordinate information of a rectangle in the case other than a table. In this case, the association unit 20 performs the following process.

First, as Process 1, the association unit 20 performs image recognition (for example, OCR) on the entire image based on the second image data and ascertains whether a standard item name or a registered alternative word is included in the image. The association unit 20 calculates a semantic distance (for example, a distance between word embeddings, which are generated using a library of distributional semantic vectors or the like) between a standard item name and each word for a standard item that does not correspond to any, and allocates a candidate having the shortest semantic distance as an item name corresponding to the standard item. This is advantageous, particularly for the classification of similar items. Accordingly, for example, when three items of Subtotal, Tax, and Total are described in an English invoice, the association unit 20 can automatically determine what classifications correspond to a tax-excluded price, a consumption tax, and a tax-included price.

Then, as Process 2, when the header name identified by the first identification unit 15 is an item name corresponding to a standard item in Process 1, the association unit 20 sets the corresponding row or column as a recognition target area. When recognition of a table is designated for a template, recognition of a table is performed on all pages to be recognized. Since there is a possibility that the number of rows or the number of columns of a table will increase or decrease for each page, it is not necessary to set coordinate information at the time of automatic generation of a template, and it is more advantageous if the coordinate information is not set. When it is necessary to set specific coordinates for a table, the specific coordinates are manually set by a user after the template has been automatically generated.

Then, as Process 3, the association unit 20 clusters characters (a character string image) recognized in Process 1 on the basis of coordinate information thereof. The association unit 20 sets an area corresponding to an item name allocated to a standard item other than header item to extend to a cluster having a shortest coordinate distance. In this case, the association unit 20 selects a cluster, not including an item name to which a standard item is allocated out of the clusters located on the right or lower side of the coordinates of the character string image indicating the item name. The association unit 20 sets an area of an item without an item name on the basis of only the position of the cluster. For example, the title of an accounting supporting document uses a character string cluster that is located at the uppermost center.

The association unit 20 performs character recognition on all areas associated with standard items on the basis of language/character type data stored in the storage unit 24 and employs language/character type data, which is most suitable for a dictionary. Here, regarding standard items, which are format designation objects such as a date, a price, and a volume, the language/character type is recognized using a regular expression, which will be described later, instead of using the language/character type data. Examples of the language/character type data include English data, data including only numerical values and punctuations, Japanese data, and handwritten character data, and a character recognizing unit may use different language/character type data by item depending on a recognition target.

The association unit 20 applies a format to a result of character recognition in the recognition target area associated with the standard item allocated by the allocation unit 19, as described above. Regarding the format, examples of a format of an invoice date include a Japanese era format, a Christian era format, and a format using symbols such as a slash "/" or a period ".". Since all the formats corresponding to an invoice date, which are standard items, are registered as regular expressions in advance, a regular expression suitable for the result of character recognition is employed as a format of a template. In the case of an invoice, standard items such as a unit price, a volume, a tax-excluded price, a consumption tax, and a tax-included price in addition to the invoice date should be designated in format. At the time of character recognition, regular expressions indicating the formats are used as search conditions for filtering the result of character recognition.

The display unit 25 (the output unit) outputs the purpose classification identified by the first identification unit 15 and standard items and other characters in the format in which the standard items and the other characters are associated with each other by the association unit 20.

The output control unit 21 recognizes the format of the standard items and the characters associated by the association unit 20, arranges the format as a template, and displays the template on the display unit 25. That is, the output control unit 21 allocates the language/character type data of which the result of character recognition is most suitable for a dictionary out of the language/character type data registered in advance for each standard item to each recognition target area set by the association unit 20. When there is a format that is registered as a regular expression in advance for each standard item, the output control unit 21 allocates a format that is suitable for the result of character recognition to each recognition target area set by the association unit 20. The output control unit 21 sets a recognition target area/header name, a language/character type, and a format corresponding to each label as a template. The output control unit 21 displays the set template on the display unit 25. The output control unit 21 may store data on the template in the storage unit 24.

FIG. 5 is a diagram illustrating an example of a template that is displayed on the display unit 25.

The template illustrated in FIG. 5 corresponds to the description of the accounting supporting document illustrated in FIG. 3. Numerals or the like described in the template illustrated in FIG. 5 can be changed by allowing a user to operate an input key, a mouse, and the like of the information processing device 1.

An information processing method, according to an embodiment, will be described below.

Figure 6:
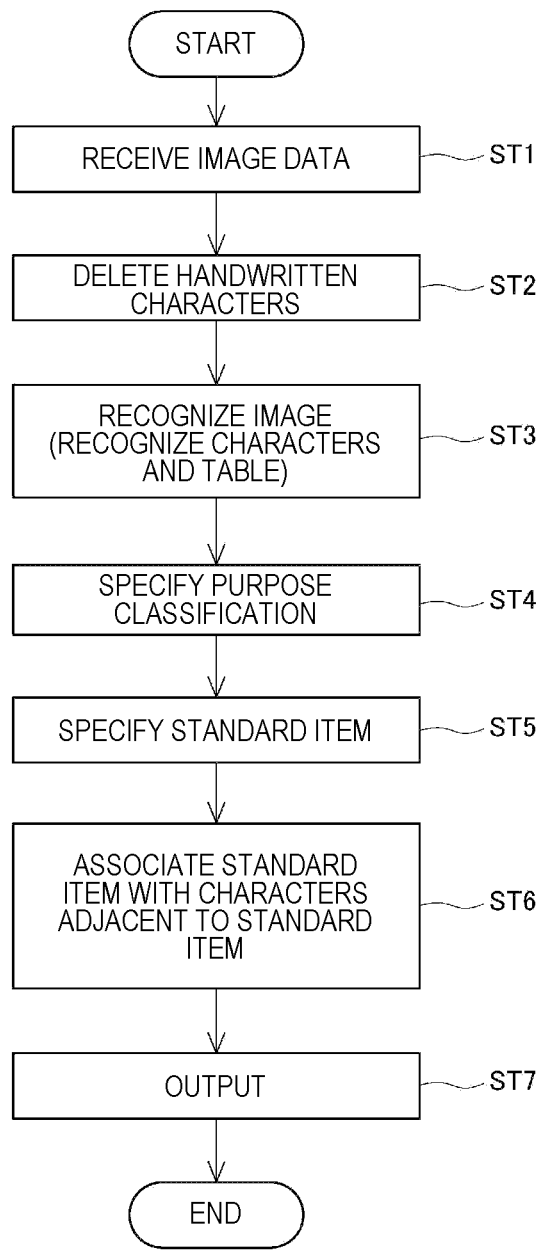
FIG. 6 is a flowchart illustrating an information processing method according to an embodiment.

FIG. 6 is a flowchart illustrating an information processing method according to an embodiment.

In Step ST1, the reception unit 11 receives image data on an accounting supporting document (first image data). For example, the reception unit 11 reads image data on an accounting supporting document stored in the storage unit 24 and receives an input of the read image data to the information processing device 1. When image data on an accounting supporting document has been received by the communication unit 23, the reception unit 11 may receive the image data.

In Step ST2, the first acquisition unit 12 performs character recognition on the basis of an image of the image data (the first image data), received in Step ST1, and deletes handwritten characters in the accounting supporting document.

For example, the first acquisition unit 12 (the second identification unit 13) estimates a printed area in which characters are printed and a handwritten area in which characters are handwritten in the accounting supporting document corresponding to the first image data and identifies the handwritten area.

The first acquisition unit 12 (the replacement unit 14) replaces characters described in the handwritten area identified by the second identification unit 13 with a background color.

In Step ST3, the first acquisition unit 12 recognizes an image on the basis of the image data (second image data) from which the handwritten characters have been deleted in Step ST2. For example, the first acquisition unit 12 recognizes characters and a table through image recognition.

In Step ST4, the first identification unit 15 identifies a purpose classification on the basis of the characters recognized in Step ST3 or the image data (the first image data) received in Step ST2.

Specifically, when a specific keyword (for example, "INVOICE") is included in the characters recognized in Step ST2 and the characters are located in the vicinity of the head of the accounting supporting document, the first identification unit 15 identifies the characters as the purpose classification.

The first identification unit 15 (the second acquisition unit 16) acquires features of an image based on the image data (the second image data). The first identification unit 15 (the preparation unit 17) prepares a shortlist of model images, which are candidates for a purpose classification, on the basis of the features acquired by the second acquisition unit 16. The first identification unit 15 (the third identification unit 18) identifies a purpose classification on the basis of the degrees of similarity between the features of the model images included in the shortlist prepared by the preparation unit 17 and the features of the second image data.

In Step ST5, the allocation unit 19 identifies a standard item of the accounting supporting document on the basis of the characters recognized in Step ST3 and allocates the characters corresponding to the identified standard item to the standard item. For example, the allocation unit 19 allocates standard items to characters, which are predetermined for each purpose classification, corresponding to the purpose classification identified by the first identification unit 15 on the basis of the characters recognized in Step ST3 and the header name of the table.

In Step ST6, the association unit 20 associates adjacent characters. That is, the association unit 20 associates the characters corresponding to the standard item identified in Step ST5 with other characters adjacent to the characters.

In Step ST7, the display unit 25 (the output unit) outputs the purpose classification identified by the first identification unit 15 and the standard item and other characters in a format in which the standard item and the other characters are associated by the association unit 20. That is, the output control unit 21 recognizes a format of the standard item and the characters associated by the association unit 20, then arranges the format as a template, and displays the template on the display unit 25.

Advantageous effects of this embodiment will be described below.

The information processing device 1 includes: a reception unit 11 configured to receive image data regarding an accounting supporting document; a first acquisition unit 12 configured to recognize characters in the image data and to acquire the recognized characters as character data; a first identification unit 15 configured to identify a purpose classification, which is a purpose of the accounting supporting document, on the basis of the character data acquired by the first acquisition unit 12 and the image data received by the reception unit 11; an allocation unit 19 configured to identify a standard item regarding the accounting supporting document on the basis of the character data and to allocate characters corresponding to the identified standard item to the standard item; an association unit 20 configured to associate the characters corresponding to the standard item identified by the allocation unit 19 with other characters adjacent to the characters; and an output unit configured to output the purpose classification identified by the first identification unit 15 and the standard item and the other characters in a format in which the standard item and the other characters are associated by the association unit 20.

The information processing device 1 can digitize settings of character recognition (for example, OCR) for each format of various accounting supporting documents. That is, the information processing device 1 can generate and output a template corresponding to accounting supporting documents.

The information processing device 1 requires an operation, which is performed by a user, such as the construction of a model image database and designation of standard items for each purpose classification, but can automatically set a character recognition template for non-structured accounting supporting documents in addition to structured accounting supporting documents.

In the information processing device 1, the first acquisition unit 12 includes: a second identification unit 13 configured to estimate a printed area and a handwritten area in the accounting supporting document corresponding to the image data and to identify the handwritten area; and a replacement unit 14 configured to replace characters described in the handwritten area identified by the second identification unit 13 with a color of a background in which no character is described.

Accordingly, when handwritten characters are in an accounting supporting document, the information processing device 1 does not digitize the handwritten characters and can output only printed parts of the accounting supporting document as a template.

In the information processing device 1, the first identification unit 15 includes: a second acquisition unit 16 configured to acquire a feature of an image based on the image data; a preparation unit 17 configured to prepare a shortlist, which is candidates for the purpose classification, on the basis of the feature acquired by the second acquisition unit 16; and a third identification unit 18 configured to identify the purpose classification on the basis of the shortlist prepared by the preparation unit 17 and the feature of the image data.

Accordingly, the information processing device 1 can identify a purpose classification (for example, an invoice) indicating a purpose of an accounting supporting document and can also identify standard items corresponding to the purpose classification.

The information processing method causes a computer to perform: a reception step of receiving image data regarding an accounting supporting document; a first acquisition step of recognizing characters in the image data and acquiring the recognized characters as character data; a first identification step of identifying a purpose classification, which is a purpose of the accounting supporting document, on the basis of the character data acquired in the first acquisition step and the image data received in the reception step; an allocation step of identifying a standard item regarding the accounting supporting document on the basis of the character data and allocating characters corresponding to the identified standard item to the standard item; an association step of associating the characters corresponding to the standard item identified in the allocation step with other characters adjacent to the characters; and an output step of outputting the purpose classification identified in the first identification step and the standard item and the other characters in a format in which the standard item and the other characters are associated in the association step.

The information processing method can digitize settings of character recognition (for example, OCR) for each format of various accounting supporting documents. That is, the information processing method can generate and output a template corresponding to accounting supporting documents.

The information processing method requires an operation, which is performed by a user, such as the construction of a model image database and designation of standard items for each purpose classification, but can automatically set a character recognition template for non-structured accounting supporting documents in addition to structured accounting supporting documents.

The information processing program causes a computer to perform: a reception function that receives image data regarding an accounting supporting document; a first acquisition function that recognizes characters in the image data and acquiring the recognized characters as character data; a first identification function that identifies a purpose classification, which is a purpose of the accounting supporting document, on the basis of the character data acquired by the first acquisition function and the image data received by the reception function; an allocation step that identifies a standard item regarding the accounting supporting document on the basis of the character data and allocates characters, corresponding to the identified standard item, to the standard item; an association step that associates the characters, corresponding to the standard item identified by the allocation function, with other characters adjacent to the characters; and an output function that outputs the purpose classification identified by the first identification function, the standard items and the other characters in a format in which the standard item and the other characters are associated by the association function.

The information processing program can digitize settings of character recognition (for example, OCR) for each format of various accounting supporting documents. That is, the information processing program can generate and output a template corresponding to accounting supporting documents.

The information processing program requires an operation, which is performed by a user, such as the construction of a model image database and designation of standard items for each purpose classification, but can automatically set a character recognition template for non-structured accounting supporting documents in addition to structured accounting supporting documents.

The above-mentioned units of the information processing device 1 may be embodied as functions of an arithmetic processing device or the like of a computer. That is, the reception unit 11, the first acquisition unit 12, the first identification unit 15, the allocation unit 19, the association unit 20, and the output control unit 21 of the information processing device 1 may be embodied as a reception function, a first acquisition function, a first identification function, an allocation function, an association function, and an output control function of the arithmetic processing device or the like of a computer.

The information processing program can cause a computer to perform the above-mentioned functions. The information processing program may be recorded in a non-transitory computer-readable recording medium such as external memory or optical disc.

As described above, the units of the information processing device 1 may be embodied by an arithmetic processing device or the like of a computer. The arithmetic processing device or the like is constituted by, for example, integrated circuits or the like. Accordingly, the units of the information processing device 1 may be embodied as circuits constituting the arithmetic processing device or the like. That is, the reception unit 11, the first acquisition unit 12, the first identification unit 15, the allocation unit 19, the association unit 20, and the output control unit 21 of the information processing device 1 may be embodied as a reception circuit, a first acquisition circuit, a first identification circuit, an allocation circuit, an association circuit, and an output control circuit of the arithmetic processing device or the like of a computer.

The input unit 22, the communication unit 23, the storage unit 24, and the output unit (the display unit 25) of the information processing device 1 may be constituted by, for example, integrated circuits or the like and may be embodied as an input circuit, a communication circuit, a storage circuit, and an output circuit (a display circuit). The input unit 22, the communication unit 23, the storage unit 24, and the output unit (the display unit 25) of the information processing device 1 may include an arithmetic processing device or the like and may be embodied as an input function, a communication function, a storage function, and an output function (a display function). The input unit 22, the communication unit 23, the storage unit 24, and the output unit (the display unit 25) of the information processing device 1 may be constituted by, for example, a plurality of devices and may be embodied as an input device, a communication device, a storage device, and an output device (a display device).

EXPLANATION OF REFERENCES

1 Information processing device
10 Control unit
11 Reception unit
12 First acquisition unit
13 Second identification unit
14 Replacement unit
15 First identification unit
16 Second acquisition unit
17 Preparation unit
18 Third identification unit
19 Allocation unit
20 Association unit
21 Output control unit
22 Input unit
23 Communication unit
24 Storage unit
25 Display unit (Output unit)

What is claimed is:

1. An information processing device comprising a processor programmed to:
receive image data regarding an accounting supporting document;
recognize characters in the image data and to acquire the recognized characters as character data;
identify a purpose classification, which is a purpose of the accounting supporting document, on the basis of the character data acquired and the image data received;

identify a standard item regarding the accounting supporting document on the basis of the character data and to allocate characters corresponding to the identified standard item to the standard item;

associate the characters, corresponding to the standard item identified, with other characters adjacent to the characters, wherein, as part of associating the characters, corresponding to the standard items, with other characters adjacent to the characters, the processor is further programmed to:

search the character data to determine whether the character data contains characters corresponding to a standard item name or a pre-registered alternative word related to the standard item, and associate the characters that do not correspond to the standard item name or the pre-registered alternative word with the characters corresponding to the standard item name if the characters that do not correspond to the standard item name or the pre-registered alternative word have a semantic distance close to the characters corresponding to the standard item name, when associating the characters corresponding to the standard item name with the other characters that are adjacent to the characters, select the other characters that are adjacent to the characters corresponding to the standard item name and different from the characters with which the standard item name is associated, and associate the selected characters with the characters corresponding to the standard item name; and output the purpose classification identified, and the standard item and the other characters in a format in which the standard item and the other characters are associated.

2. The information processing device, according to claim 1, wherein the processor is further programmed to:

estimate, using a machine learning model which is generated in advance, a printed area in which characters are printed and a handwritten area in which characters are handwritten in the accounting supporting document corresponding to the image data received and to identify the handwritten area; and replace the characters described in the handwritten area identified with a color of a background in which no character is described.

3. The information processing device, according to claim 1 or 2, wherein the processor is further programed to:

acquire a feature of an image based on the image data;

prepare a shortlist of model images which are candidates of which a degree of similarity is equal to or greater than a threshold value for the purpose classification on the basis of the feature acquired and the features of a plurality of model images which are prepared in advance; and identify the purpose classification on the basis of the shortlist prepared and the feature of the image data.

4. An information processing method of causing a computer comprising a processor programmed to perform:

a reception step of receiving image data regarding an accounting supporting document;

a first acquisition step of recognizing characters in the image data and acquiring the recognized characters as character data;

a first identification step of identifying a purpose classification, which is a purpose of the accounting supporting document, on the basis of the character data acquired in the first acquisition step and the image data received in the reception step;

an allocation step of identifying a standard item regarding the accounting supporting document on the basis of the character data and allocating characters, corresponding to the identified standard item, to the standard item;

an association step of associating the characters, corresponding to the standard item identified in the allocation step, with other characters adjacent to the characters, wherein the association step further comprises:

searching the character data to determine whether the character data contains characters corresponding to a standard item name or a pre-registered alternative word related to the standard item, and associating the characters that do not correspond to the standard item name or the pre-registered alternative word with the characters corresponding to the standard item name if the characters that do not correspond to the standard item name or the pre-registered alternative word have a semantic distance close to the characters corresponding to the standard item name, when associating the characters corresponding to the standard item name with the other characters that are adjacent to the characters, selecting the other characters that are adjacent to the characters corresponding to the standard item name and different from the characters with which the standard item name is associated, and associating the selected characters with the characters corresponding to the standard item name; and an output step of outputting the purpose classification identified in the first identification step, the standard item, and the other characters in a format in which the standard item and the other characters are associated in the association step.

5. A non-transitory computer readable medium having an information processing program stored thereon, the information processing program, when executed, causing a computer to perform:

a reception function of receiving image data regarding an accounting supporting document;

a first acquisition function of recognizing characters in the image data and acquiring the recognized characters as character data;

a first identification function of identifying a purpose classification, which is a purpose of the accounting supporting document, on the basis of the character data acquired by the first acquisition function and the image data received by the reception function;

an allocation function of identifying a standard item regarding the accounting supporting document on the basis of the character data and allocating characters, corresponding to the identified standard item, to the standard item;

an association function of associating the characters, corresponding to the standard item identified by the allocation function, with other characters adjacent to the characters, wherein the association function further comprises the functions of:

searching the character data to determine whether the character data contains characters corresponding to a standard item name or a pre-registered alternative word related to the standard item, and associating the characters that do not correspond to the standard item name or the pre-registered alternative word with the characters corresponding to the standard item name if the characters that do not correspond to the standard item name or the pre-registered alternative word have a semantic distance close to the characters corresponding to the standard item name, when associating the characters corresponding to the standard item name with the other characters that are adjacent to the characters, selecting the other characters that are adjacent to the characters corresponding to the standard item name and different from the characters with which the standard item name is associated, and associating the selected characters with the characters corresponding to the standard item name; and an output function of outputting the purpose classification identified by the first identification function, and the standard item and the other characters in a format in which the standard item and the other characters are associated by the association function.

* * * * *